Figure 1:
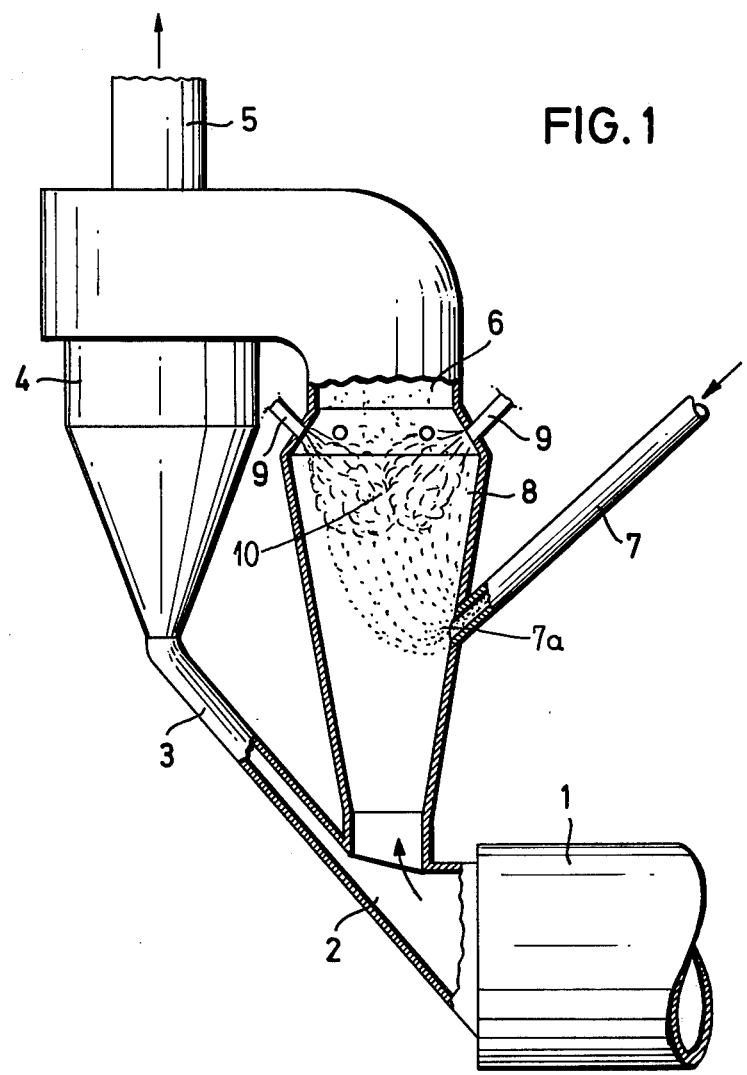

United States Patent [19]

Brachthauser et al.

[11] 4,062,691

[45] Dec. 13, 1977

[54] METHOD FOR THE THERMAL TREATMENT OF FINELY GRANULAR MATERIAL, PARTICULARLY FOR THE CALCINING OF CEMENT

[75] Inventors: Kunibert Brachthauser, Bensberg; Hubert Ramesohl, Bensberg-Refrath; Klaus Beisner, Hoffnungsthal; Horst Herchenbach, Troisdorf, all of Germany

[73] Assignee: Klockner-Humboldt-Deutz Aktiengesellschaft, Germany

[21] Appl. No.: 678,951

[22] Filed: Apr. 21, 1976

Related U.S. Application Data

[63] Continuation-in-part of Ser. No. 665,327, March 9, 1976.

[30] Foreign Application Priority Data

Apr. 21, 1975 Germany .............................. 2517552

[51] Int. Cl.$^2$ .............................................. C04B 7/36
[52] U.S. Cl. .................................................. 106/100
[58] Field of Search ........................................ 106/100

[56] References Cited

U.S. PATENT DOCUMENTS

| 3,203,681 | 8/1965 | Rosa et al. | 106/100 |
| 3,212,764 | 10/1965 | Muller | 106/100 |
| 3,957,521 | 5/1976 | Ritzmann | 106/100 |

*Primary Examiner*—J. Poer
*Attorney, Agent, or Firm*—Hill, Gross, Simpson, Van Santen, Steadman, Chiara & Simpson

[57] ABSTRACT

A process and mechanism for thermally treating fine ground material for the calcining of cement in stages which passes finely ground calcareous and argillaceous material into a vertical chamber to enter a deacidifying zone, supplying fuel to the vertical chamber with a supply of oxygen so that the fuel is partially oxidized prior to mixing with the material and the fuel, oxygen and material are supplied so that the material is deacidified in the range of 50% to 80%, passing exhaust gases from a kiln into the deacidifying zone, and passing material from the deacidifying zone through a cyclone separator to separate the gases and deliver the preheated material to the kiln for completion of the burning process.

6 Claims, 2 Drawing Figures

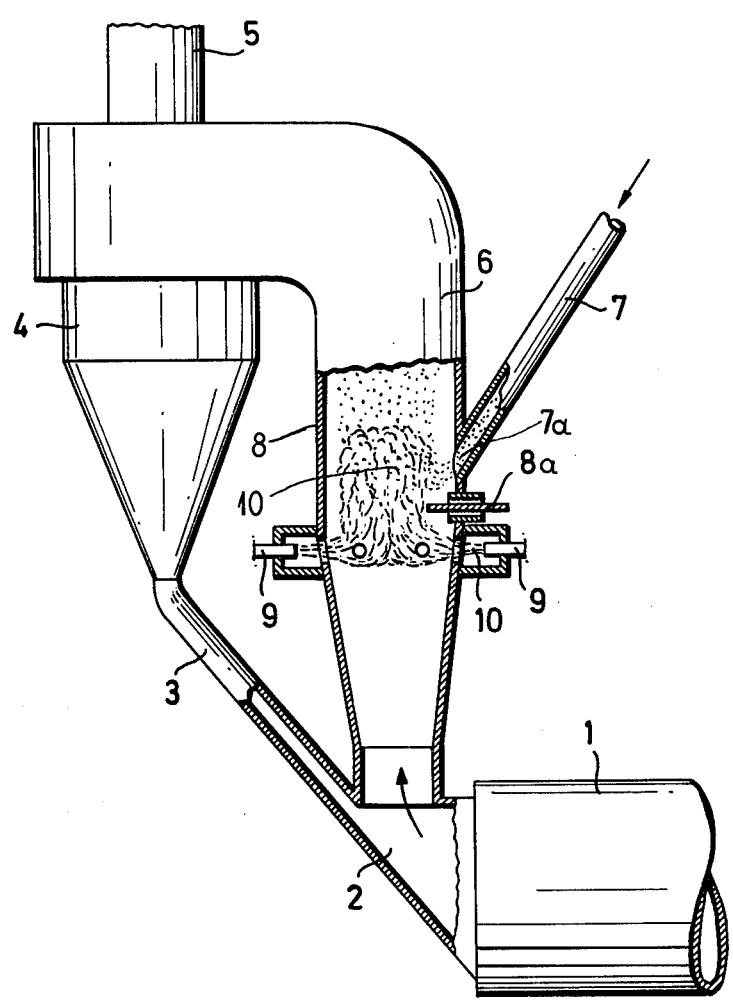

METHOD FOR THE THERMAL TREATMENT OF FINELY GRANULAR MATERIAL, PARTICULARLY FOR THE CALCINING OF CEMENT

BACKGROUND OF THE INVENTION

The present invention is a continuation-in-part of our application, Ser. No. 665,327, filed Mar. 9, 1976.

The invention relates to an improved method and mechanism for the thermal treating of fine granular calcareous and argillaceous materials for the calcining of cement in stages where the material is preheated in an improved manner prior to being fed to the kiln for the completion of the calcining process.

In the production of cement, it is present practice to grind a suitable mixture of calcareous and argillaceous materials in the proper proportions which will provide a raw material in the correct composition to form a finished cement. The raw materials are calcined or burned in a kiln which conventionally is a huge cylindrical rotating furnace which heats the material to drive off the carbon dioxide and combine the lime of the calcareous materials with the silica alumina of the argillaceous materials so that they partially fuse or clinker together. Concepts have been introduced for preheating the materials prior to their entering the kiln, and the present arrangement relates to a unique and improved method and apparatus for the treatment of cement materials including heat treatment prior to final calcining in the kiln.

In the treatment of pulverized raw materials, they are generally preheated and delivered to a suspension gas heat exchanger including several cyclones which are connected in superimposed arrangement so that the particles of pulverized raw material are preheated by means of hot exhaust gases received from the rotary kiln and passed through the cylones. In the arrangement employed, the finely ground raw materials are deacidified before they are passed into the rotary kiln and calcined for completion. The deacidification of the raw material comprises the dissociation of calcium carbonate in the reaction $CaCO_3 \rightarrow CaO + CO_2$. The degree of deacidification as used herein is an expression of the amount of $CO_2$ driven out of the material and the deacidification is the ratio of the $CO_2$ driven out (in kg $CO_2$/kg clinkers) to the $CO_2$ present in the originally delivered pulverized raw material (in kg $CO_2$/kg clinkers) in percent. The circulation dust which is finely discharged from the rotary kiln, which is separated and may be partially deacidified, is not taken into consideration.

The process in steps is generally comprised of two partial processes, the first being a heat utilizing low temperature process for degasifying, low deacidizing (or neutralizing) of the material, and the second step being a low heat utilizing high temperature process for the sintering and melting of the material. The last step occurs in the kiln wherein combustion is maintained by powdered coal, oil or gas, and a blast of air to provide the temperatures required for the burning process. The clinker which comes from the kiln may be stored and is ground in ball mills or other suitable equipment to provide the finished cement.

With the conventional preheating that takes place prior to delivering the material to the kiln, only a small part of the total heating energy is transferred to the material, and by far the greatest amount of heat transfer is supplied in the rotary kiln. Thus, with the lower temperature process which takes place in preheating, on account of the small surface area of the material, substantial quantities of heat must be transferred, particularly for deacidizing the pulverized material in the temperature range of 800° C – 900° C, and as a rule this requires more than half of the calcining space available in the rotary kiln or furnace. In the exothermic high temperature process for sintering the material in the kiln, the area per unit of heat transfer is not as large.

With conventional methods where the entire thermal energy is supplied in the rotary kiln or furnace with high output yields, unequal distribution of heating can occur within the kiln, and the thermal degree of effectiveness and output capability of the furnace is limited, and also the lasting quality of the fire bricks in the kiln is decreased so that the investment costs and maintenance expenditures are disproportionately high.

In order to be able to decrease the size of the rotary kiln in length and diameter, and to increase its output capability, efforts have been made to preheat the material being fed to the kiln in a heat utilizing low temperature process provided in a precalcining zone arranged between a preheater and the rotary kiln, as shown in U.S. Pat. No. 3,203,681. This necessitates an installation with a part connected in series with the kiln so that the particles of material are thermally treated in a current of hot gas while the complete calcining takes place exclusively in the rotary kiln so that the kiln may be shortened in length.

A complete calcining of the material tends to be attained with this type of construction as the temperatures for the calcination are uncontrolled so that the fusible pulverulent material because of the coarsening of the grain and incipient plasticity acquired through passing through a melting phase converts the material into an undesirable condition. This results in preventing the proper flow of the material out of the preheating zone into the rotary kiln.

In order to obtain a uniform supply of heat for a complete calcination for the precombustion or precalcining treatment, it has been proposed to provide other combustion chambers which are expensive in operation and require an intensive intermixture of the raw material and fuel to prevent harmful excesses or peaks of temperature. It has also been suggested (German Laid Open Specification 2,324,519) to mix the fuel with the raw material to be calcined before the raw material in the combustion zone is introduced into the stream of gas coming from a rotary kiln or furnace. With the high temperatures of the pulverized raw material in this type of operation, a uniform mixing requires an additional high expenditure for apparatus. Otherwise, a nonuniform distribution of the quantities of materials results so that at certain points, the concentration of raw material is so high that a poor calcining condition prevails, and at other locations, the concentration of raw materials is so low that at these points, high peaks of temperature occur with the disadvantages referred to above. Also, for the complete calcination of the material in the chambers provided in advance of the kiln, stable operation requires an appreciable excess of fuel. This results in an eventual postcalcination in the preheaters connected in series with the precalcination zone so that the mechanism is thermally overloaded and will adjust itself to higher exhaust gas temperatures resulting in higher heat losses.

We have discovered that the high investment costs which occur where all of the calcination takes place in the rotary kiln will be reduced, as well as eliminating the difficulties which occur with the calcination of the raw material in a precalcining zone arranged between the preheater and the rotary kiln can be prevented. In accordance with the invention, in a separate calcining process, preheated material is deacidized to a degree of deacidification in the range of 50% to 80%, and the remaining deacidizing and calcining to completion take place directly in kiln or furnace. With this arrangement, the pulverulent or fluid characteristics of the finely ground solids are retained after the precalcination so that the flowability and dischargability of the material from the last step of the preheater and into the inlet of the kiln remains. Also, the dispersability of the material into the stream of gas is retained so that optimum heat transition from the hot gas of the material to be treated in the precalcining zone is insured. With the present arrangement, the degree of deacidizing is reliably controlled. The harmful results of overheating of the pulverized raw material as they occur in known methods which employ complete deacidizing are prevented. Also the occurrence of molten masses, the formation of clinker materials, and the release of alkali vapors which when again condensed lead to the caking of the particles of material, are avoided. In accordance with the invention, the preheated material is deacidized to a degree of deacidification in the range of 50% to 80%, and preferably from 60% to 75%. By a limited use of fuel in the combustion preheating zone, the exhaust gas loss is held low, and the heat requirement of the overall installation is reduced.

In accordance with one embodiment of the invention, a supply of oxygen is provided from the kiln exhaust gases. These exhaust gases have an oxygen content in the range of 8% to 13%. The remaining oxygen is supplied from another source in the combustion zone in order to support combustion of the fuel. This arrangement makes it possible to reduce the high temperature in the rotary kiln without limiting its output capability, and the life of the furnace lining is prolonged. The calcining temperature does not drop below the low limits for complete calcining in the furnace. In any event, a small quantity of additional oxygen is supplied to attain a complete combustion of the fuel, obtaining an intensive effect of the calcination process in the deacidifying zone and an accurate control of the degree of deacidifying. It is possible to use combustion air from a cooler connected in series with the furnace, but the expenditure for this additional equipment is high and increases the total cost.

It is accordingly an advantage of the present arrangement to provide the fuel required for the separate combustion process for the deacidifying zone with oxygen supplied with the fuel, or using an oxygen containing gas. With this arrangement, the combustion of the fuel begins immediately upon attainment of ignition temperatures, and does not wait for the distribution of fuel in the material gas stream. The combustion occurs during distribution. With this, the combustion zone can be held small, and the degree of deacidification can be adjusted exactly corresponding to the requirement for operation in accordance with the other operating parameters and in accordance with the percentage of deacidification set forth above.

If is further contemplated that the fuel required for the deacidification process is first partially oxidized, and then combined with the finely ground raw material with the material introduced above or below the fuel feed. In other words, the fuel is fed into a vertical chamber, is partially oxidized, and the material is introduced above or below the fuel in the chamber with the two intermixing in the deacidifying zone. With this arrangement, it is insured that the entire quantity of fuel is ignited before contact with the material in the deacidification zone. This employs a uniform and controlled combustion making efficient use of the fuel and obtaining a predetermined partial deacidification of the pulverized raw material.

It is accordingly an object of the present invention to provide an improved method and apparatus for the calcining of cement in steps wherein a controlled and partial deacidification takes place prior to the material being introduced into the kiln.

Other objects, advantages and features, as well as equivalent methods which are intended to be covered herein, will become more apparent with the teachings of the principles of the invention in connection with the disclosure of the preferred embodiments in the specification, claims and drawings in which:

DRAWINGS

FIG. 1 is an elevational view, with portions in section, illustrating a structure for operating in accordance with the process of the inention; and FIG. 2 is another elevational view, with parts partially broken away, illustrating another apparatus for carrying out the process of the invention.

DESCRIPTION

As illustrated in FIG. 1, a rotary kiln or furnace 1 is provided having a lining for the burning of materials for the manufacture of cement. Means for firing the kiln are provided, which are not shown for convenience, and these can be of conventional construction utilizing a mixture of pulverized coal or natural gas or oil and air. The exhaust gases from the kiln 1 pass out through the inlet end as indicated by the arrowed line up through a vertical chamber 8. Material which has been preheated and predeacidified is supplied into the kiln through the inlet chamber 2. This material comes down from the conduit 3 leading from a cyclone 4 of a suspended gas heat exchanger. The cyclone heat exchanger arrangement is of conventional design with the material passing through a cyclone separator wherein the gas is separated and heat exchange takes place. A preferred arrangement embodies a single cyclone, although a series of cyclones may be employed. Above the cyclone 4 is located the gas takeoff 5. The gas takeoff may lead to additional further cyclone preheater stages for preheating the material and utilization of the heat content of the gases from the deacidifying zone of the vertical chamber 8.

The deacidifying chamber continues upwardly with a gas conduit 6 which leads to the intake of the cyclone designated at 4.

The initial supply of finely ground calcareous and argillaceous materials is supplied through a material supply pipe 7. The pipe passes through the wall of the vertical chamber 8 in a downward direction, and is dispersed across the chamber 8 being carried upwardly by the upwardly flowing exhaust gases from the kiln 1.

For providing the heat necessary to a deacidifying zone 10 within the vertical chamber 8, a fuel supply includes a plurality of fuel lines 9, preferably distributed annularly around the chamber 8. The fuel inlets are arranged preferably above the entry mouth 7a of the material supply pipe 7. The vertical chamber 8 preferably is somewhat conical shaped widening in an upward direction which improves the flow of exhaust gases in an upward direction for the distribution of material. The deacidifying zone 10 leads upwardly to the exhaust gas conduit 6, and with additional cyclones employed, the pipe 6 may be arranged to branch to lead into the additional cyclones.

In the arrangement of FIG. 2, similar parts carry similar numerals, and a raw material inlet line 7 has an inlet 7a above the deacidifying zone 10. Fuel supplied through the lines 9 is provided with oxygen in an annular chamber 10 prior to entering the deacidifying zone through openings in the wall of the chamber 8. In this arrangement, the fuel is first ignited before mixing with the material, and being first mixed with the exhaust gases coming up from the kiln 1 as indicated by the arrowed line. In the arrangement of FIG. 1, the material is first mixed with the exhaust gases.

In accordance with the process of the arrangements shown, heated exhaust gases flow out through the entry end of the kiln 1 and upwardly through the vertical cylindrical chamber 8. Raw material is thoroughly distributed across the chamber, and fuel is ignited but only partial combustion has occurred before mixing with the material in the deacidifying zone 10. In that zone combustion continues supported by the supply of oxygen mixed with the fuel and the supply of oxygen in the heated exhaust gases from the kiln, and the control of the supply of material and fuel is such that the deacidification takes place in the amount of 50% to 80%. Preheating continues throughout the cyclone chambers, and the remaining gases and released carbon dioxide are separated and flow out through the gas outlet 5 of the cyclones with the separated material passing downwardly through the line 3 into the inlet of the kiln for the completion of the calcining process.

We claim as our invention:

1. A process for thermally treating fine grained material for the calcining of cement in stages comprising:

passing finely ground calcareous and argillaceous material into a preheating zone at a controlled rate;

heating the material in the preheating zone to obtain a deacidification of the material in the range of 50% to 80%;

and subsequently feeding the deacidified material to a kiln for completion of the burning process.

2. A process for thermally treating fine grained material for the calcining of cement in stages in accordance with the steps of claim 1:

wherein the material is deacidified to a degree of deacidification of 60% to 70% in the preheating zone.

3. A process for thermally treating fine grained material for the calcining of cement in stages in accordance with the steps of claim 1:

wherein heat is added in the preheating zone and is supplemented with a flow of oxygen containing gases from the kiln.

4. A process for thermally treating fine grained material for the calcining of cement in stages in accordance with the steps of claim 1:

in that heat is added in the preheating zone by a burner supplied with fuel and a supply of oxygen is furnished to the preheating zone.

5. A process for thermally treating fine grained material for the calcining of cement in stages in accordance with the steps of claim 1:

in that heat is added to the preheating zone by directing a fuel which is partly oxidized before entering the preheating zone and combined with the material in the preheating zone for completion of oxidation of the fuel.

6. A process for thermally treating fine grained material for the calcining of cement in stages in accordance with the steps of claim 1:

wherein heat is added to the preheating zone by the introduction of fuel at a point separate from the introduction of material, and oxygen is supplied to the fuel at a location so that the fuel is partially oxidized before entering the preheating zone and mixing with the material.

* * * * *